United States Patent [19]

Meng

[11] Patent Number: 5,276,775
[45] Date of Patent: Jan. 4, 1994

[54] SYSTEM AND METHOD FOR BUILDING KNOWLEDGE-BASED APPLICATIONS

[75] Inventor: Alex C. Meng, Plano, Tex.
[73] Assignee: Texas Instruments Inc., Dallas, Tex.
[21] Appl. No.: 960,310
[22] Filed: Oct. 13, 1992

Related U.S. Application Data

[63] Continuation of Ser. No. 624,155, Dec. 7, 1990, abandoned.

[51] Int. Cl.⁵ .............................................. G06F 15/00
[52] U.S. Cl. .................................... 395/55; 395/52; 395/76
[58] Field of Search ............................ 395/55, 76, 52

[56] References Cited

PUBLICATIONS

Foundations of Assumption-Based Truth Maintenance Systems; Reiter et al; Automated Reasoning; pp. 183-188.
Artificial Intelligence Programming; Lawrence Erlbaum Publishers; 1987; pp. 337-347, 369, 371, and 372.
The Truth, the Whole Truth, and Nothing But the Truth; J. P. Martins; AI Magazine-Special Issue; 1990; pp. 7-25.

*Primary Examiner*—Allen R. MacDonald
*Attorney, Agent, or Firm*—Robert L. Troike; Leo N. Heiting; Richard L. Donaldson

[57] ABSTRACT

A method and system (10) associates a deductive reasoning system having a forward deductive reasoning portion (13), a backward deductive reasoning portion (15), and a frame template portion (18) with a constraint satisfaction system (12) within a unified framework (11). The unified framework (11) incorporates a truth maintenance system to maintain dependency between premises, rules, and consequences in the deductive reasoning system (13, 15, and 18) and between initial constraints and propagated constraints in constraint satisfaction system (12). The system (10) treats constraints as declarative statements in order to maintain logical dependency under the truth maintenance system of unified framework (11).

48 Claims, 11 Drawing Sheets

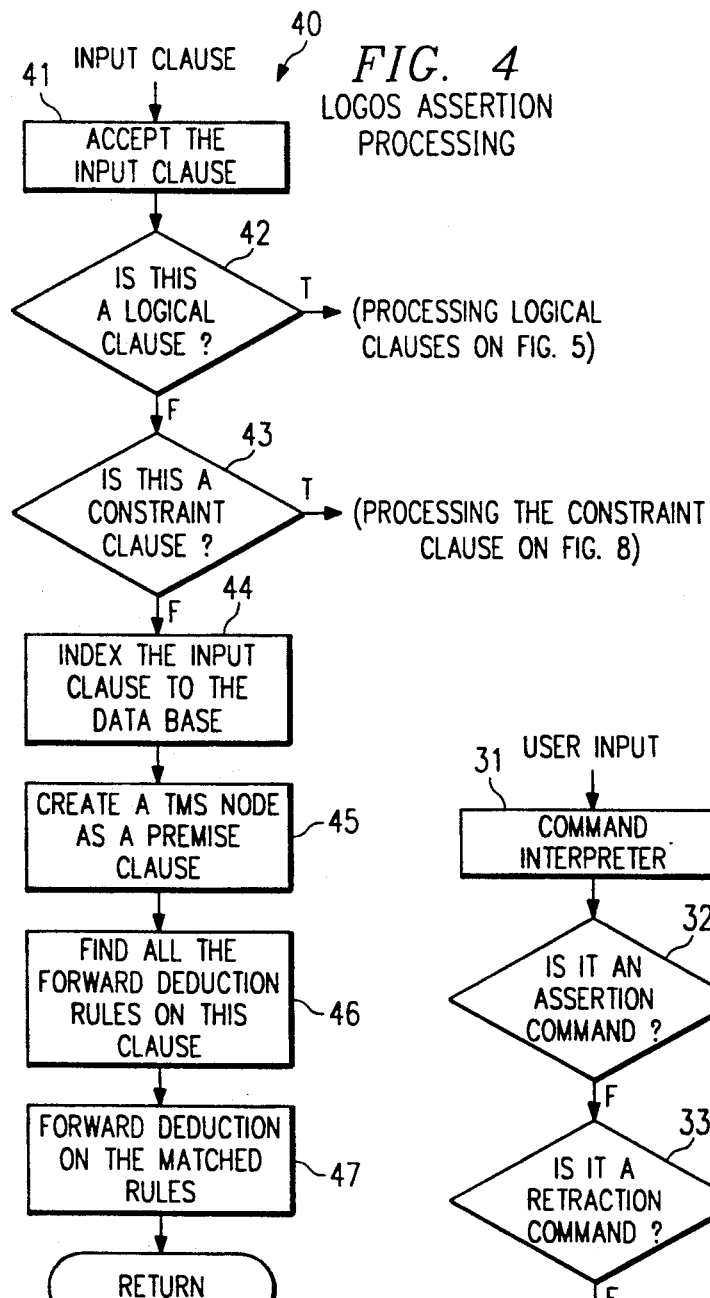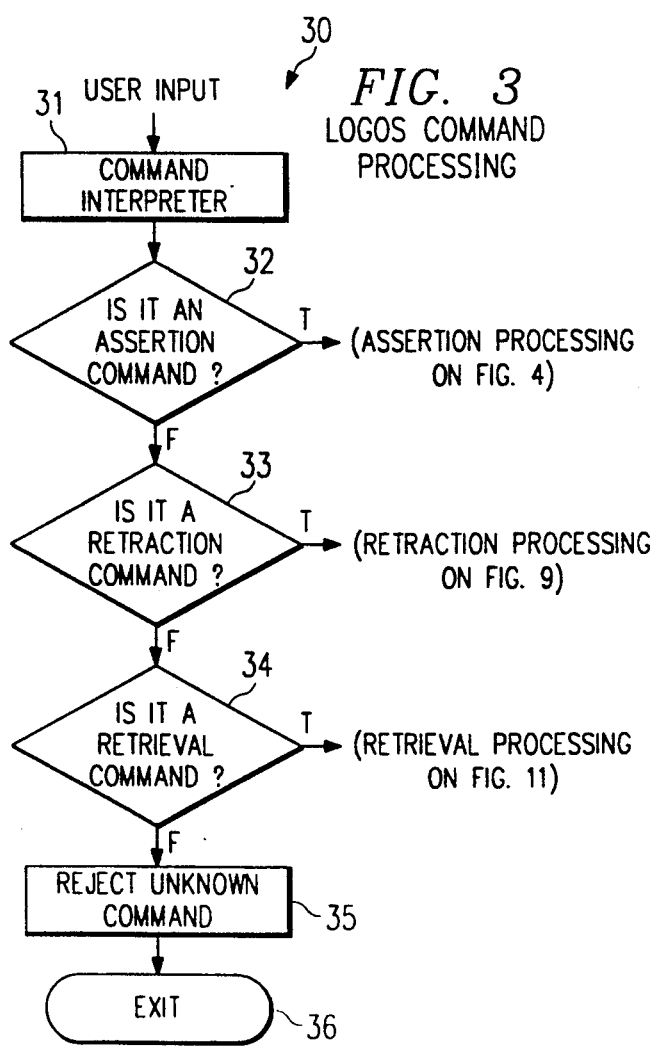

PROCESSING "AND"-ELIMINATION

PROCESSING LOGICAL CLAUSES

PROCESSING MODUS PONENS

PROCESSING ASSERTION OF CONSTRAINT CLAUSES

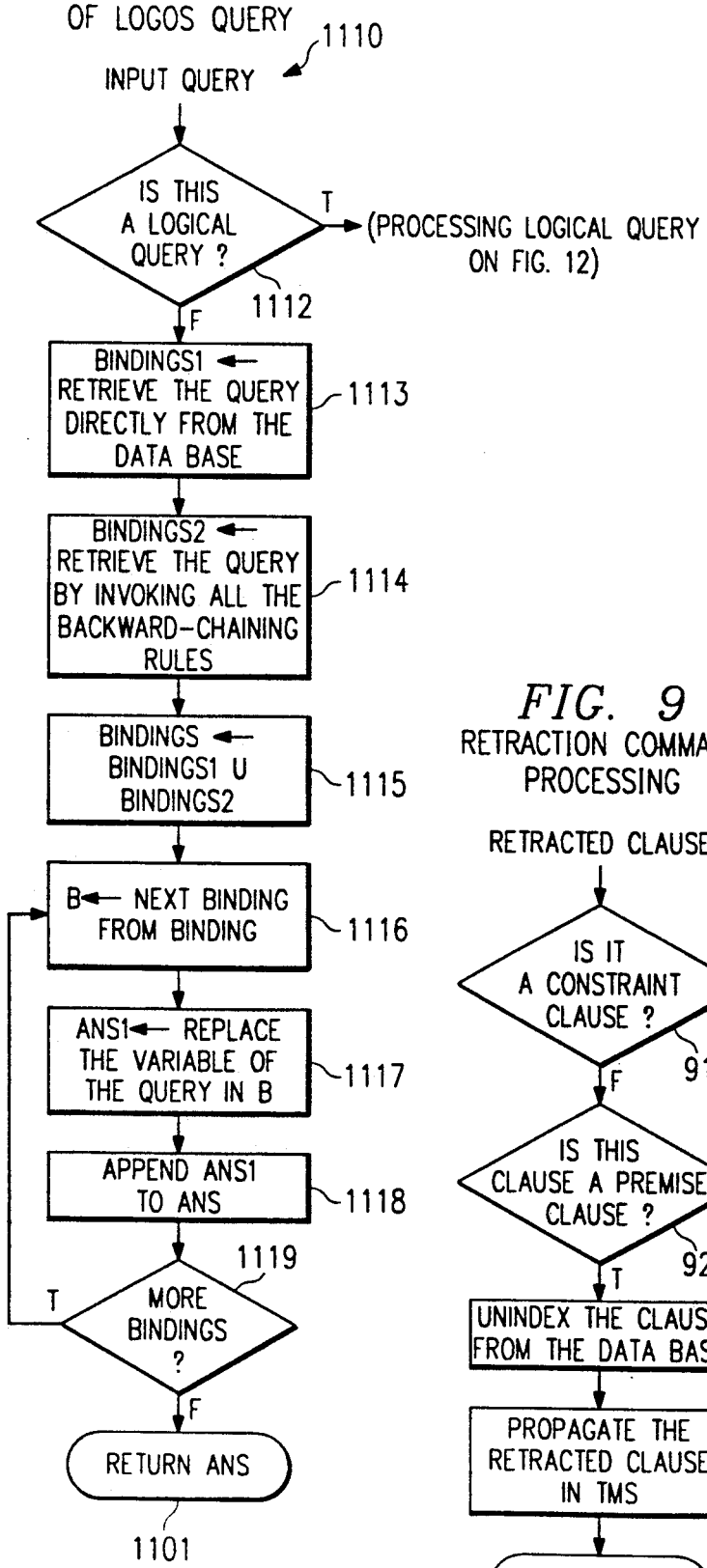
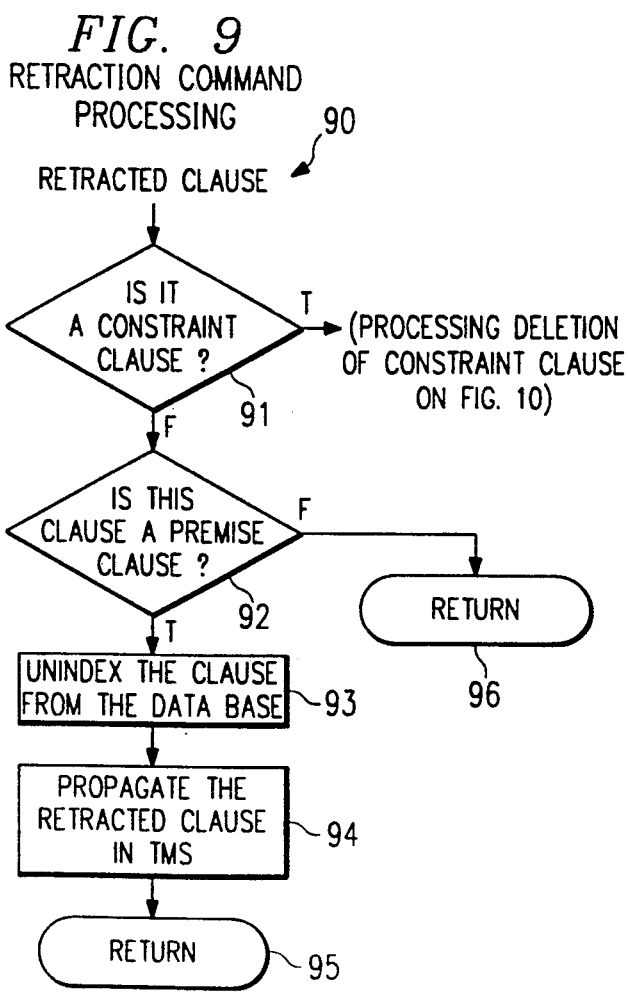

PROCESSING RETRACTION OF LOGOS CONSTRAINT CLAUSES

PROCESSING LOGICAL QUERIES IN LOGOS

FIG. 15

PROBLEM BOARD

PROBLEM: Aircraft-Maintenance-Location-Affects-Flight
CONTEXT: Real-World
Affected Entry : MAINT-ENTRY-3381, Aircraft:HSTGG-AIRCRAFT AIRCRAFT-MAINTENANCE-AFFECTS-FLIGHT  Ac: HSTGG-AIRCRAFT  Flights: TG914: DEL-LHR, TG915: LHR-DEL, Unexamined
AIRCRAFT-MAINTENANCE-LOCATION-AFFECTS-FLIGHT  Ac: HSTGG-AIRCRAFT Flight: TG914: DEL-LHR, Identified-Solution Problems

SUBSTITUTE AIRCRAFT SOLUTIONS

Solution #1  not examined:
Swap HSTGH-AIRCRAFT For HSTGG-AIRCRAFT
    Initial Delay = 0 hours 0.00 minutes
    Flights:   TG914: DEL-LHR
               TG915: LHR-DEL Solution #2  not examined:
Swap HSTGH-AIRCRAFT For HSTGG-AIRCRAFT
    Initial Delay = 0 hours 0.00 minutes
    Flights:   TG914: DEL-LHR
               TG915: LHR-DEL
               TG915: DEL-BKK
               TG914: BKK-DEL
               TG914: DEL-LHR
               TG915: LHR-DEL
               TG915: DEL-BKK Swap HSTGG-AIRCRAFT For HSTGH-AIRCRAFT
    Initial Delay = 2 hours 8.00 minutes
    Flights:   TG935: DEL-BKK
               TG485: BKK-SYD
               TG485: SYD-MEL

AIRCRAFT DELAY SOLUTIONS

Aircraft            Flights            Delay Alt?

RE-ROUTE AIRCRAFT SOLUTIONS

AIRCRAFT CANCELLATION SOLUTIONS

Aircraft              Flights              Alt?
HSTGG-AIRCRAFT        TG914: DEL-LHR       NIL
                      TG915: LHR-DEL

5,276,775

SYSTEM AND METHOD FOR BUILDING KNOWLEDGE-BASED APPLICATIONS

This application is a continuation of application Ser. No. 07/624,155, filed Dec. 7, 1990 now abandoned.

TECHNICAL FIELD OF THE INVENTION

The present invention generally concerns tools for decision making and more particularly provides a system and method for integrating deductive reasoning and constraint satisfaction systems in a coherent framework for a variety of applications.

BACKGROUND OF THE INVENTION

Artificial intelligence, a subfield of computer science, attempts to understand the nature of intelligent action and construct computer systems capable of such action. One of the foundations of artificial intelligence is problem-solving methodology. For example, with a given representation of a task to perform, a method must be adopted that can guide the problem solver to accomplish the task. Acceptable problem-solving methodologies start with the problem to be solved and stress good representation using constraints to reduce the search space for feasible solutions.

A constraint is a relationship; a mathematical or logical expression over a set of constraint variables. The goal of a constraint system is to find the maximal subset of the legal values of a constraint variable, such that all of its associated constraints are satisfied. A variable X is a constraint variable if X can only take its value from a set D, the domain or legal values of X. Concentrating on constraints as part of a problem solving methodology allows the problem solver to uncover useful, interacting constraints or to propagate constraints that achieve global consistency through local computation.

In propagating constraints, the problem solver can find values for problem parameters that are consistent everywhere with some stipulated constraints. Propagation procedures operate independently on only a few parameters in a small set, and therefore are said to do local computation. When the constraints are satisfied everywhere, the consistency is said to be "global". Hence, the point of constraint propagation is to achieve global consistency through local computation.

The focus of a constraint satisfaction problem (CSP) is to derive the subset of its legal values (the constrained values) such that the constraints can be satisfied. Usually a CSP is solved through the process of constraint propagation. Constraint satisfaction has been used in circuit layout/analysis/simulation applications, and lately in scheduling and resource allocation problems.

Rule-based systems provide another problem-solving methodology that is popular in building artificial intelligence systems. One particularly important type of rule-based system is known as a deductive reasoning system. In a deductive reasoning system, statements known as "rules" have antecedents (or "if" parts) followed by consequences (or "then" parts). Rules are expressed in two different modes depending on use in the forward deduction or backward deduction paradigm. A forward-chaining rule represents a logical deduction based on the modus ponens, i.e. $p, p \rightarrow q, q$. Backward deduction takes the form, $q, p \leftarrow q, p$.

Operations management includes problems such as project planning and scheduling, resource allocation and optimization. These problems are common in both industrial and administrative domains and, these problems can be viewed as constraint satisfaction and deductive reasoning problems. In the field of operations research, for example, there are valuable analysis tools such as Performance Evaluation and Review Techniques (PERT), Critical Path Method (CPM), and the Gantt chart. Optimization procedures such as linear programming solve some important aspects of these problems. However, these tools assume a static problem definition and, for large-scale operations, take an excessive amount of time to compute the optimal solution.

In real life operations, dynamic changes, updates or perturbations, from minor to serious, are an immanent part of the problem. Before re-running an expensive optimization procedure, it is critical to analyze the down-line effects of these perturbations, process "what-if" scenarios, and check if simple heuristic rules will correct the problem. Heuristics such as task rearrangement, priority changes, first-in-first-out, inconsistent start or finish time shifts, constraint retraction, etc., have been the major source of expertise accumulated through experience. If a system existed that could rapidly use these heuristic tools together as a constraint satisfaction problem coupled with a deductive reasoning system, the user could easily and efficiently respond to dynamic changes. Such a system could process "what-if" scenarios in both a forward-chaining and backward-chaining framework. Furthermore, by combining constraint satisfaction with deductive reasoning, a much richer set of relationships would be possible for problems such as those of operations management.

There is, therefore, a need for a knowledge-processing environment that integrates constraint satisfaction and deductive reasoning methodologies.

There is a need for a system and method that provide a simple and straightforward rule-based framework to encode reasoning strategies.

There is a need for a method that combines a constraint system with a deductive reasoning system and allows the user to hypothetically visualize future scenarios by asking "what-if" questions.

There is a need for a system and method that provide a richer set of temporal relationships than the precedence relationships alone can provide for operations management problems.

There is a need for a system and method that are designed for modeling dynamic perturbations in the operations management domain.

There is a need for a system and method to encode expertise in relaxation strategies when situations arise that cause current operations to fail.

SUMMARY OF THE INVENTION

The system and method of the present invention provide inventive subject matter to overcome the problems and satisfy the needs already mentioned. The present invention is a shell or system building tool for knowledge-based applications and is designed to be application-oriented. The invention includes a deductive reasoning system and a constraint satisfaction system that are associated with one another through a truth maintenance system.

The truth maintenance system maintains dependency between premises and consequences. Premises may be either logical premises of a deductive reasoning or constraints of a constraint satisfaction system. If a premise is a constraint, it is expressed as a declarative statement form in order that the truth maintenance system can maintain relationships between initial constraints and propagated constraints. Initial constraints are treated by the truth maintenance system as premises; propagated constraints arising from constraint propagation are treated as logical consequences. Therefore, whenever a premise, whether a logical premise or a constraint, changes, the consequences in the system change logically.

The present invention is designed to model dynamic perturbations in operations management and similar domains. The present invention expresses temporal constraint satisfaction problems in a declarative framework and propagates constraints to model the "downline effect" of changes. Within this framework, the user may hypothetically visualize future scenarios by asking "what-if" questions.

Another aspect of the system and method of the present invention is the use of relaxation strategies in the constraint satisfaction context. With constraint relaxation strategies, the user may encode the heuristics used by human managers when an original plan fails and a constraint violation occurs. The system of the present invention provides a deductive framework in which heuristic knowledge (or constraint relaxation strategies) can be expressed in a simple and straightforward way.

A technical advantage of the present invention is that it establishes a knowledge-processing environment that integrates constraint-based reasoning, truth maintenance, and deductive reasoning.

Yet another technical advantage is that the present invention encodes expertise in relaxation strategies when situations arise that cause current operations to fail.

Another technical advantage is that it that provides a simple and straightforward rule-based framework to encode these strategies in reasoning rules.

Another technical advantage of the present invention is that it allows the user to model decision-making in a dynamic environment. Once a choice is made from several alternatives, the present invention deduces its consequences, and maintains the logical dependency between the premises and consequences. When the user retracts a decision later, the system identifies and retracts all related consequences. If a solution must meet constraints, constraints can be added and deleted from time to time, and the system of the present invention will maintain the dependency between the set of possible values and the set of outstanding constraints inside the system.

The system of the present invention is written in Common LISP and supports applications in operations management and military domains. Industrial applications include (i) constraint checking and resolution in airline operation control; (ii) scheduling, planning and resource allocation in factory automation; (iii) constraint checking in the placement of integrated circuits on printed-circuit boards during manufacturing; and (iv) maintaining the dependencies in a change management and version control system in the object-oriented database. Military applications include mission planning and management, and scheduling problems in naval air strike planning.

BRIEF DESCRIPTION OF THE DRAWINGS

For a more complete understanding of the present invention and for further advantages thereof, reference is now made to the following detailed description, taken in conjunction with the accompanying figures, in which:

FIGS. 3 through 12 show flow diagrams of processing elements of a preferred embodiment of the present invention;

FIGS. 14 and 15 illustrate the use of the present invention for a problem in the airline scheduling industry.

DETAILED DESCRIPTION OF THE INVENTION

Figure 1:
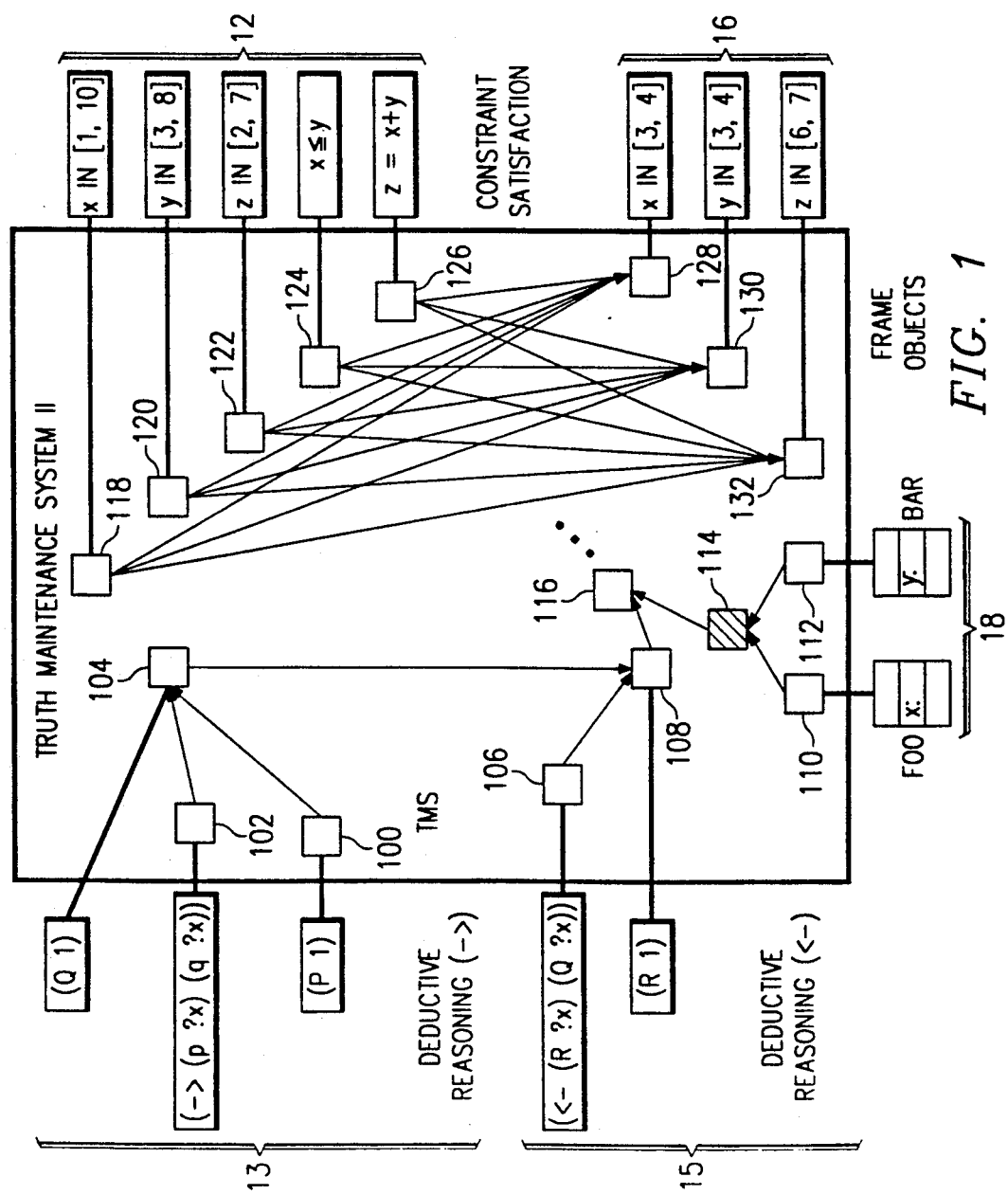
FIG. 1 diagrams the basic components of the system of the present invention.

The preferred embodiment of the present invention is best understood by referring to the figures, like numerals being used for like and corresponding parts of the various drawings.

The present invention describes a system and method for problem solving which have numerous applications. In the following description, numerous specific details are set forth in order to prove a thorough understanding of the present invention. It will be obvious, however, to one skilled in the art, that the present invention may be practiced without using these specific details. In other instances, well-known methods and structures have not been described in detail so as not to unnecessarily obscure the present invention.

Although the preferred embodiment uses computer programs as elements of the invention, using other types of elements remain within the scope and spirit of the present invention. For example, combinations of electrical circuits could provide the system and method for the present invention. Thus, although the following description uses computer programs, the description does not limit the present invention.

The computer languages FORTRAN, COBOL, ALGOL, PL/2, PASCAL, C, PROLOG, ADA, BASIC, etc. have the ability to write complicated mathematical expressions, recursions, complex data structures, and symbolic expressions. Some of these languages can write symbolic expressions that are executable as computational procedures (or programs) within the language itself. Also, some of these languages can generate symbolic expressions, although often this process is inconvenient and inefficient. In general, most computer languages do not allow arbitrarily complex expressions to be written. Also, most do not delay assigning actual computer memory (and types) redundant for such expressions until just prior to actual execution of the expression. Such a memory management method is termed dynamic storage allocation or "late binding".

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" is emerging as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated," and treating the remaining elements of the list as arguments of that function. Moreover, unless otherwise indicated, LISP reads, evaluates, and returns a value for each such function it encounters. Thus, in LISP, entire computer programs can appear as functions within functions within functions (often called "compositions" of functions). Applying functions to arguments as encountered controls the flow of the LISP program. In other words, the control structure in LISP is based on composition of functions.

Within the outermost pair or parentheses in LISP, there may be numerous functions, including functions for performing arithmetic, performing recursions, modifying symbolic expressions, conditionally varying the program flow, and other complex functions. A key feature of LISP is that LISP programs have the same form as the data (and the functions). As the above features indicate, LISP is a functional programming language. LISP is not the only existing functional programming language, nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

Although LISP can be run on virtually any computer, it is preferable to use a computer designated to perform LISP functions. The Texas Instruments Explorer II computer is particularly advantageous for these purposes because it contains microprocessor chip (called the Mega Chip) which performs LISP functions directly. The Mega Chip contains basic microcode that corresponds directly to the basic operations of LISP. These include, among others, basic LISP operations for constructing stacks (which, among other things, retain references to repeated calls on functions) and performing other operations peculiar to LISP. A conventional microprocessor chip (such as the Intel 80286 contained in the IBM AT computer) can be programmed to carry out the various LISP functions by applying its generic computer instructions to the requirements of LISP.

The system of the present invention uses a small set of utility functions for knowledge-based applications to integrate two different problem-solving paradigms (constraint propagation and deductive reasoning) into a unified, declarative framework. The system is also application-oriented to allow users to build a domain-specific shell for the application to fit problem-solving needs. The system of the present invention is not intended to be a standalone system. Although it maintains a data base of assertions, the system can use external data bases and frame systems as a source of information.

FIG. 1 illustrates conceptually the basic components of system 10 of the present invention. The elements of system 10 include constraint satisfaction system 12 that associates with forward deductive reasoning system 13, backward deductive reasoning system 15, and template system 18, through a truth maintenance system represented by framework 11 of the present invention.

From forward deductive reasoning system 13, truth maintenance system 11 can be thought to receive the fact, (P 1), and the modus ponens rule, (→(p ?x) (q ?x)), as premises and assign to them nodes 100 and 102, respectively. Under the modus ponens rule, (P 1) and (→(p ?x) (q ?x)) infer the consequence, (Q 1). Framework 11 assigns to this consequence the node 104 and thereafter maintains the dependency of node 104 on nodes 100 and 102. Similarly, in the backward deductive reasoning system 15, truth maintenance system 11 can be thought to receive the rule, (←(r ?x) (q ?x)). Since (Q 1) was inferred from the forward deductive reasoning system, it is taken as a premise to infer the consequence, (R 1). The truth maintenance system 11 assigns to the rule, (←(r ?x) (q ?x)), the node 106 and to the consequence, (R 1), the node 108. Thereafter, truth maintenance system 11 maintains the dependency of node 108 on nodes 106 and 104.

Also associated with the deductive reasoning system 13 are frame templates FOO and BAR. Templates FOO and BAR define attributes or characteristics that a node may acquire through inheritance. The deductive reasoning system treats these templates as premises for deriving an inference relationship. Within the deductive reasoning system, templates FOO and BAR generate nodes 110 and 112 from which node 114 depends. Node 114 and 108 can be combined in the deductive reasoning system to generate node 116. Framework 11 maintains the dependency of node 116 on nodes 114 and 108.

From the constraint satisfaction system 12, the constraints "x IN [1,10]," "y IN [3,8]," "z in [2,7]," "x≦y," and "z=x+y", respectively, generate nodes 118, 120, 122, 124, and 126. These constraints, after propagating, generate the consequences: "x IN [3,4]," "y IN [3,4]," and "z IN [6,7]" that respective nodes 128, 130, and 132 indicate in truth maintenance system 11. Truth maintenance system 11 maintains the dependency of nodes 128,130, and 132 on nodes 118,120,122,124, and 126.

If, in the forward deductive reasoning system, (P 1) is retracted, truth maintenance system 11 removes node 100. Removal of node 100 causes removal of node 104. Removal of node 104 causes removal of node 108. If either node 110 or 112 is removed, truth maintenance system 100 removes node 114 and, subsequently, node 116. Likewise, if any of nodes 118 through 126 is removed, nodes 128 through 132 are removed from the constraint satisfaction system and may be replaced by nodes satisfying the new set of constraints.

In truth maintenance system 11, there is no operational difference in the interpretation or generation of the nodes. All are maintained through the dependency links that truth maintenance system 11 generates. Within truth maintenance system the present invention associates the deductive reasoning system (that may use forward deductive reasoning 13 or backward deductive reasoning 15, or operate with frame templates 18) with constraints satisfaction system (that uses initial constraints 12 and propagated constraints 16).

The system 10 of the present invention quantifies the constrained variables to obtain a range of legal values for the constrained variables, and encodes the constrained variables and the legal values as declarative statements called "state descriptors." Within the deductive reasoning system, the system 10 maintains the state descriptors on a "stack". A "stack" is a data structure that maintains data in a "first-in-last-out" fashion. With the state descriptors on a stack, the system infers a plurality of constraint values.

Constraint satisfaction is embedded within the deductive framework through the modus ponens inference frame of the present invention. Constraints are expressed declaratively, as would be any other fact or rule. Thus, the user can express a constraint satisfaction problem in declarative form as a logic deduction problem.

Truth maintenance system 11 of the present invention may use one of the several designs. For example, those systems described in J. Doyle, "*A Truth Maintenance System*," AI Journal, 1979, and J. D. deKleer, "*An Assumption-based TMS*," AI Journal, 1986 may be used. The preferred embodiment of the present truth maintenance system invention, however, implements a three valued system owing to its simplicity and efficiency. This system is disclosed in D. McAllester, "A Three-Valued Truth Maintenance System," AI Memo 473, AI Lab, MIT, 1978.

Truth maintenance system 11 creates a data-dependency node for every fact, state descriptor, and rule within the knowledge base of system 10. These nodes form a data-dependency network (i.e., a propositional constraint network). When a premise (fact or rule) is retracted from the knowledge base (i.e. when it is no longer believed), markers or labels propagate through the whole network to find all the consequences and mark them OUT (or False).

Within the truth maintenance system, a fact or rule is "believed" if, and only if, it has a data-dependency node marked IN (or True). It may be either a premise or a consequence. By tracing the data dependency links, a consequence can be explained through the deduction chain all the way down to the set of premises. Being able to explicitly maintain the data dependency link (the deduction chains) gives the user the capability to control, explain, examine, and debug the knowledge base. When a decision is later retracted, system 10 also identifies and retracts all of its consequences. If a solution has to meet constraints; constraints can be added and deleted from time to time, and the system of the present invention will maintain the dependency between the set of possible values matching the set of outstanding constraints inside the system.

Figure 2:
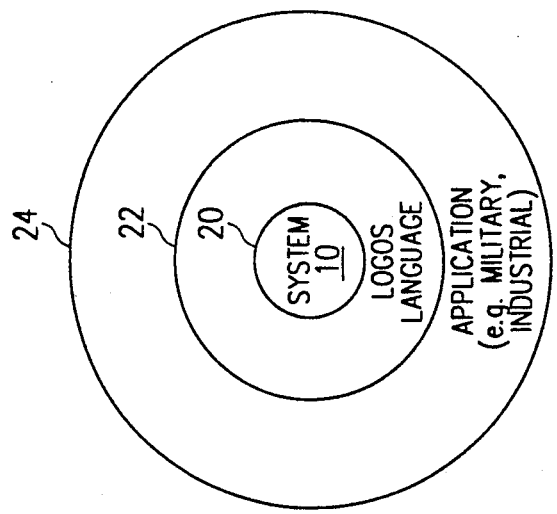
FIG. 2 illustrates the relationship between the system and method of the present invention to a computer language it may support and an application to which it may be applied.

The system 10 of the present invention provides a unified framework 11 for working problems using both a deductive reasoning system and a constraint satisfaction system. FIG. 2 illustrates the relationship between system 10, the particular language it supports, and a particular application of the invention. System 10 may be embedded within a language to handle constraint satisfaction and deductive reasoning problems as indicated by the inner circle 20. Surrounding inner circle 20, concentric circle 22 shows the particular language that system 10 supports. In the preferred embodiment, this language is called "Logos". Logos is a language written in Common Lisp that is specifically designed to model the decision-making process in dynamic environments. Appendix A attached hereto provides a listing and explanation of the construct that comprise the Logos language. The language and system 10 are applied to the specific application, as indicated by outer concentric circle 24. The particular application of the present invention may be an industrial or military problem. An example of using the present invention in an airline scheduling problem is provided below at FIGS. 15 and 16 and accompanying text.

FIGS. 3 through 12 provide flow charts of system 10's operation in conjunction with the Common Lisp computer language. FIG. 3 shows a flow diagram illustrating command processing in a preferred embodiment of the present invention. User input 30 causes the system of the present invention to use a command interpreter 31 to determine the characteristics of a particular command. From the command interpreter, command processing first queries whether the command is an assertion command at 32. If so, system 10 directs program control to assertion processing at FIG. 4. Otherwise, the next query is whether the command is a retraction command at 33, in which case program control goes to retraction processing at FIG. 9. If the command is not a retraction command, the next query is whether it is a retrieval command at 34. If so, control goes to retrieval processing at FIG. 11. Otherwise, the command processing algorithm rejects the command as an unknown command at 35 and exits the command processing algorithm at 36.

The Common LISP command for command processing takes the following form:

```
Logos-command-processing ()
    (LET ((command (READ-command)))
        (SELECT command
            (assertion (process-assertion)
            (retraction (process-retraction))
            (retrieval (process-retrieval))
        ))
```

© Texas Instruments, Incorporated 1990

Figure 5:
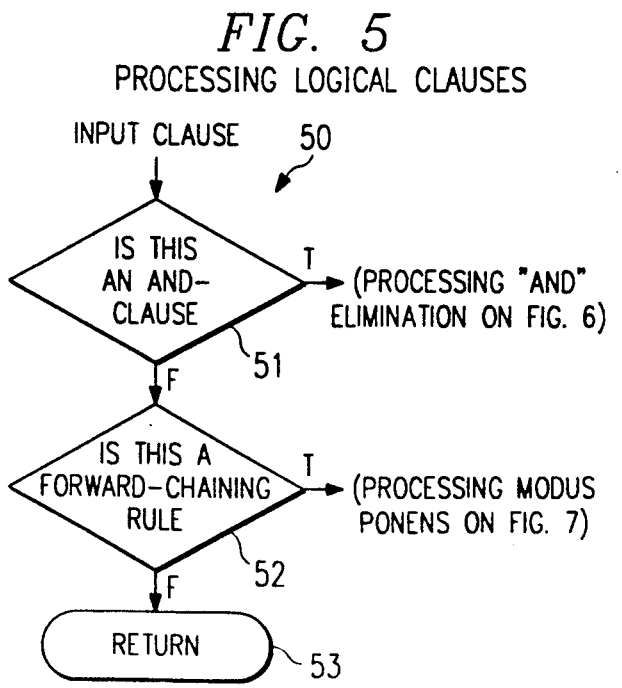

FIG. 4 provides a flow diagram of assertion processing for a preferred embodiment of the present invention. From the input clause of 40 from FIG. 3, the assertion processing algorithm first accepts the input clause at 41. Next, it queries whether the clause is a logical clause at 42. If so, control shifts to the algorithm for processing logical clauses as shown in FIG. 5. Otherwise, the next query is whether the clause is a constraint clause at 43. If it is a constraint clause, then control shifts to the algorithm for processing constraint clauses of FIG. 8. Otherwise, the next step is to index the input clause to the database at 44. The following steps are for the truth maintenance system 11 to create a node as a premise clause at 45 and find all of the forward deduction rules on this clause at 46. The system next performs forward deduction on the matched rules at 47 and then returns to the command processing algorithm of FIG. 3 for receiving processor input.

The code for the assertion processing algorithm takes the following form in Common LISP:

```
process-assertion ()
    (LET ((clause (READ-clause)))
        (COND ((logical-clause-p clause)
                (assert-logical-clause clause))
              ((constraint-clause-p clause)
                (assert-constraint-clause clause))
              (otherwise
                (index clause)
                (create-TMS-premise-clause clause)
```

```
    (FOREACH (rule :IN (find-forward-chaining-rules clause))
        :Do (foward-chain rule clause)))
))
```
© Texas Instruments, Incorporated 1990

When facts or forward deduction rules, regardless their order, are asserted into the knowledge base, forward deductions will be invoked and consequences will be asserted. Forward deduction occurs at the time when facts or rules were asserted into the fact or rule base. The order of the assertions are irrelevant, whatever logically follows by the deduction rules will be asserted. There are three basic forms of forward deductions: (i) modus ponens; (ii) Conjunctive Deduction; and (iii) Disjunctive Deduction. Deduced facts will be asserted into the factbase, triggering further forward deductions recursively. Forward deduction rules are usually used to model the action and status changes after the action has been taken.

FIG. 5 shows a flow diagram of logical clause processing in a preferred embodiment of the present invention. If the assertion processing algorithm has determined that the clause it processed was a logical clause, control shifts to the algorithm for processing logical clauses as shown in FIG. 5. This algorithm simply receives the input clause from the assertion processing algorithm 40 of the system 10 of the present invention and inputs at 50 for receipt by the query of whether this is an "AND"-clause at 51. If the clause is an "AND" clause, then control shifts to the algorithm for processing "AND" elimination on FIG. 6. If the clause is not an "AND"-clause, then control shifts to the query of whether this is a forward chaining rule at 52. If so, the logical clauses processing algorithm shifts control to the algorithm for processing modus ponens of FIG. 7. Otherwise, control returns to the command processing algorithm of FIG. 3 at 53.

The Common LISP command for this algorithm takes the following form:

```
(assert-logical-clause (clause)
    (COND ((AND-clause-p clause)
            (process-AND-elimination clause))
          ((forward-chaining-rule-p clause)
            (process-modus-ponens clause))))
```
© Texas Instruments, Incorporated 1990

Figure 6:
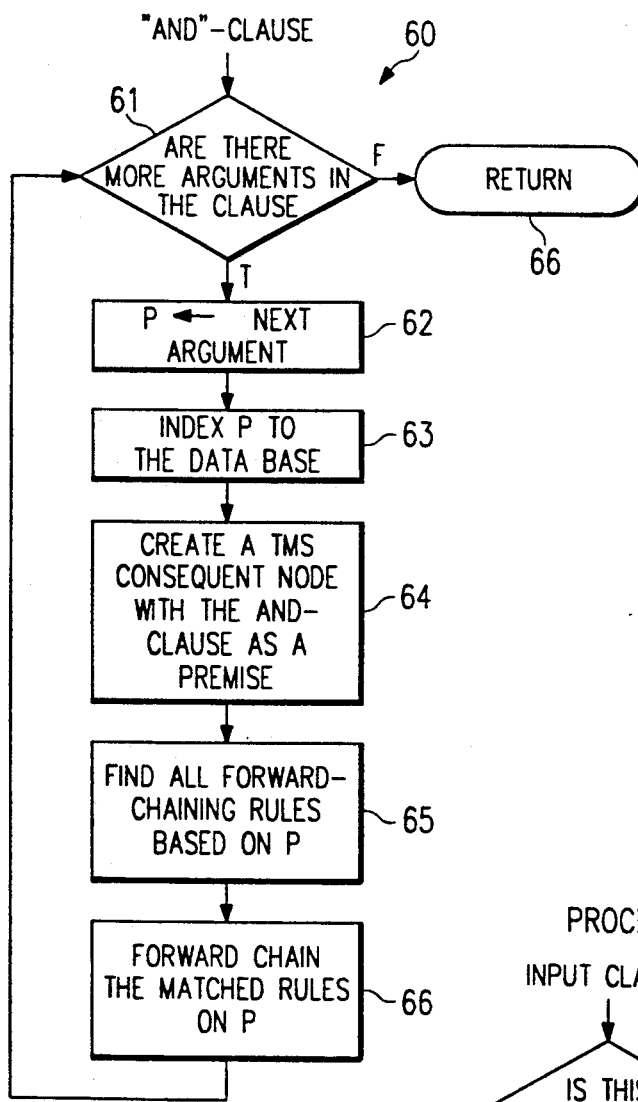

FIG. 6 provides a flow diagram of "AND"-elimination in a preferred embodiment of the present invention. If, as a result of the logical clauses processing algorithm of FIG. 5, the system of the present invention determines that the clause is an "AND"-clause, then control shifts to the processing "AND"-elimination algorithm of FIG. 6, beginning with "AND"-clause input at 60. From "AND"-clause input at 60, the first query is whether there are more arguments in the clause at 61. If not, control returns to the command processing algorithm of FIG. 3 at 66, otherwise, the "AND"-elimination algorithm performs the operation, assigned P to be on the next argument at 62 and indexes P to the database at 63. The next step is to create a TMS consequent node with the "AND"-clause as a premise at 64. Next, the "AND"-elimination algorithm of FIG. 6 finds all forward-chaining rules based on P at 65, and forward chains the matched rules on P at 66. After completing this step, control returns to the query at 61 to determine whether there are more arguments in the clause on which to perform the above sequence of steps. If there are no more arguments, then control returns to the command processing algorithm of FIG. 3 at 66.

The Common LISP code that illustrates the "AND"-elimination algorithm takes the following form:

```
process-AND-elimination (clause)
    (FOREACH (term :IN (REST clause))
        :DO (PROGN
                (index term)
                (create-TMS-consequent-clause term clause)
                (FOREACH (rule :IN (find-forward-chaining-rules term))
                    :DO (forward-chain rule term))))
```
© Texas Instruments, Incorporated 1990

Figure 7:
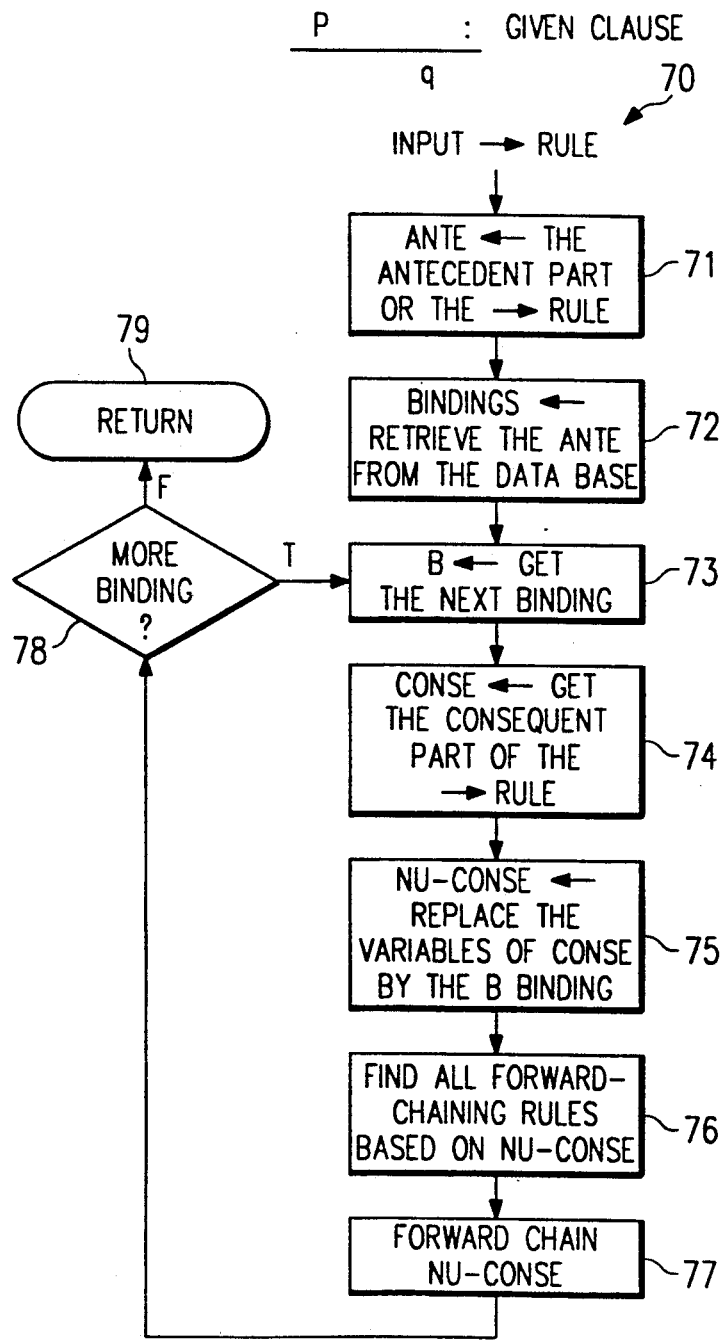

FIG. 7 is a flow diagram of modus ponens processing in a preferred embodiment of the present invention. If at the processing logical clauses algorithm of FIG. 5, it is determined that the input clause is a forward-chaining rule at 41, control shifts to the modus ponens processing algorithm shown in FIG. 7. Modus ponens operates as described in FIG. 7, such that with the forward-chaining rules, P then q and P, give the property q. The input for the modus ponens algorithm at 70, therefore, is the forward-chaining rule. With this rule, the first step of the modus ponens algorithm is to take the antecedent of the forward-chaining rule. The next step is to retrieve the bindings for the antecedent. For each binding at 73, find the consequence of the rule at 74 and replace its variable in this binding. The next step of the method is to generate the new consequent clause by replacing the variables of the consequence by the binding at 75. At 76, the algorithm finds all forward-chaining rules based on the new consequence. Then, at 77, the system 10 forward chains the new consequence and directs control to the query of whether there is more binding at 78. If so, the modus ponens algorithm takes the binding from the backward-chaining rule to get the next binding at 73 and continues through step 78. Otherwise, control shifts to return at 79 to return to the command processing algorithm of FIG. 3. Exemplary Common LISP programming language to perform the modus ponens algorithm takes the following form:

```
process-Modus-Ponens (rule)
    (LET ((ante (get-antecedent-part rule))
          (conse (get-consequent-part rule))
```

```
       nu-conse)
    (FOREACH (binding :IN (process-retrieve ante))
        :WHEN binding
        :DO (PROGN
            (SETQ nu-conse
                (replace-variables conse binding))
            (create-TMS-consequent-clause-modus-ponens nu-conse rule ante)
            (FOREACH (rule :IN (find-forward-chaining-rules nu-conse))
                :DO (forward-chain rule nu-conse)))))
```

© Texas Instruments, Incorporated 1990

Figure 8:
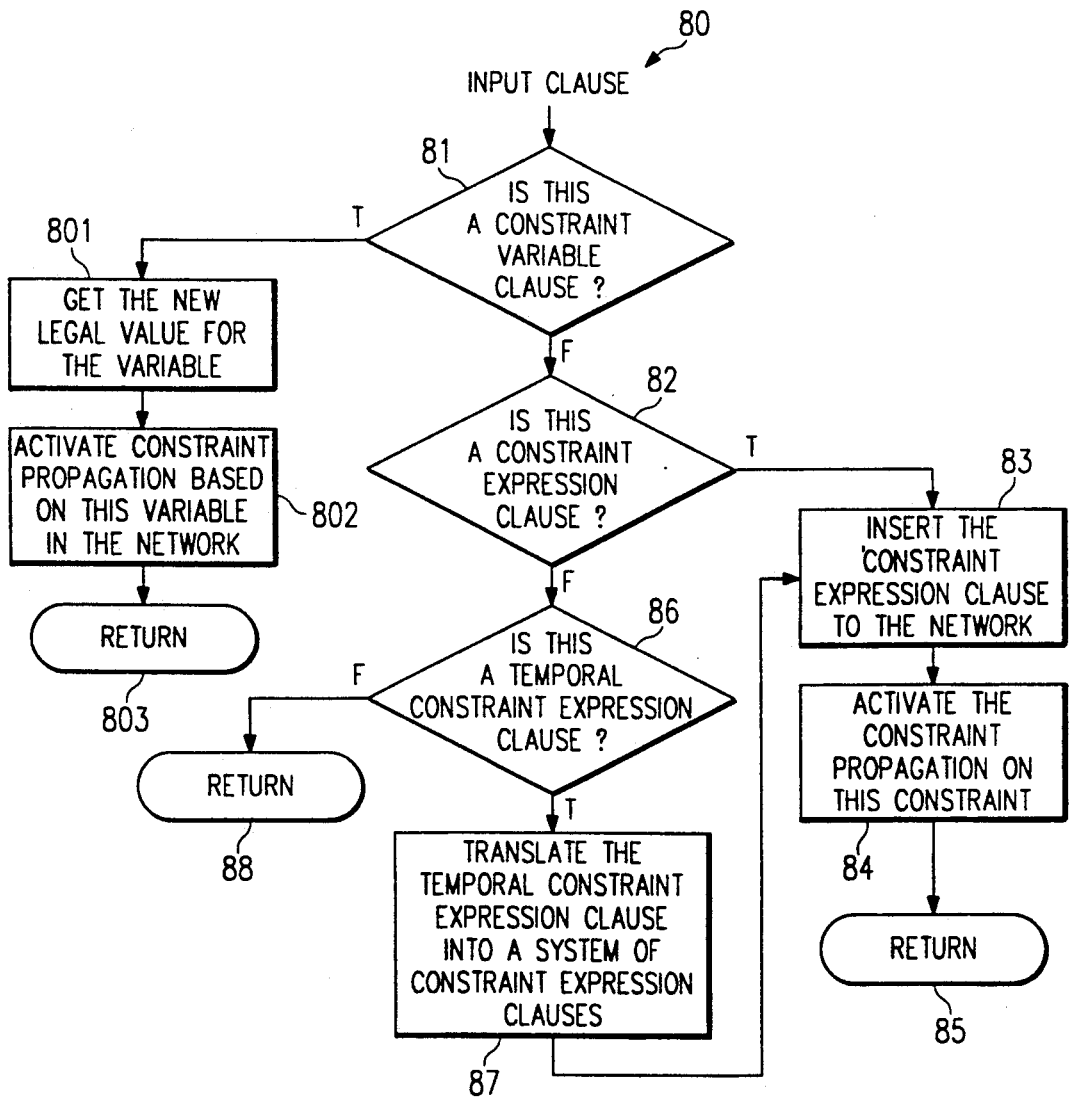

FIG. 8 is a flow diagram of processing assertion algorithm of constraint clauses in a preferred embodiment of the present invention. If, as a result of the assertion processing algorithm of FIG. 4, the system of the present invention determines at 43 that the input clause is a constraint clause, control shifts to the algorithm for processing assertion of the constraint clauses of FIG. 8. Beginning with the input clause at 80, the first query is whether this is a constraint variable clause at 81. If so, the algorithm directs the program to get the new legal value for the variable at 801 and activates constraint propagation based on this variable in the network at 802. Thereafter, control returns to the command processing algorithm of FIG. 3 at 803. If the clause is not a constraint variable clause, then flow continues to query whether this is a constraint expression clause at 82. If so, the algorithm for processing assertion of constraint clauses inserts a constraint expression clause to the network at 83 and then activates the constraint propagation on this constraint at 84. Then, control returns to the command processing algorithm of FIG. 3 at 85.

If this is not a constraint expression clause, then the algorithm queries whether this is a temporal constraint expression clause at 86. If so, the algorithm then translates the temporal constraint expression clause into a system of constraint expression clauses at 87. The next step is to insert the constraint expression clause into the network at 83, activate the constraint propagation on this constraint at 84, and return to the command processing algorithm of FIG. 3 at 85. If the clause is not a temporal constraint expression, then at 86 the processing assertion of constraint clauses algorithm returns control to the command processing algorithm of FIG. 3 at 88.

```
assert-constraint-clause (clause)
    (COND ((constraint-variable-clause-p clause)
            (update-constraint-variable
                (get-constraint-variable clause)
                (get-variable-legal-values clause))
            (activate-constraint-network))
        ((constraint-event-clause-p clause)
            (update-constraint-variable
                (get-constraint-variable
                    (translate-event-clause clause))
                (get-variable-legal-values
                    (translate-event-clause clause)))
            (activate-constraint-network))
        ((constraint-expression-clause-p clause)
            (assert-constraint-expression
                (get-constraint-name clause)
                (get-constraint-expression clause))
            (activate-constraint-network))
        ((temporal-constraint-expression-clause-p clause)
            (assert-constraint-expression
                (get-constraint-name
                    (translate-temporal-constraint clause))
                (get-temporal-constraint-expression
                    (translare-temporal-constraint clause)))
            (activate-constraint-network))
```
)

© Texas Instruments, Incorporated 1990

FIG. 9 provides a flow diagram of retraction command processing in a preferred embodiment of the present invention. At FIG. 3, the command processing algorithm queries whether the command is a retraction command at 33, in which case control shifts to the retraction command processing algorithm of FIG. 9. The retraction processing algorithm takes a retracted clause at 90, and first queries whether the clause is a constraint clause at 91. If so, control shifts by way of the retraction command processing algorithm to the algorithm for processing the retraction of constraint clauses of FIG. 10. Otherwise, the next query is whether the clause is a premise clause at 92. If not, the retraction command processing algorithm returns control to the command processing algorithm of FIG. 3 at 96. Otherwise, the next step is to unindex the clause from the database at 93. Next, the algorithm of FIG. 9 propagates the retracted clause in the TMS at 94 and returns to the command processing algorithm of FIG. 3 at 95.

The Common LISP set of commands to perform the retraction command processing algorithm in the preferred embodiment of the present invention takes the following form:

```
process-retraction ()
    (LET ((clause (READ-clause)))
        (COND ((constraint-clause-p clause)
                (retract-constraint-clause clause))
            ((consequent-clause-p clause))
            (otherwise
                (unindex clause)
                (TMS-retract-premises-clause clause))))
```

© Texas Instruments, Incorporated 1990

Figure 10:
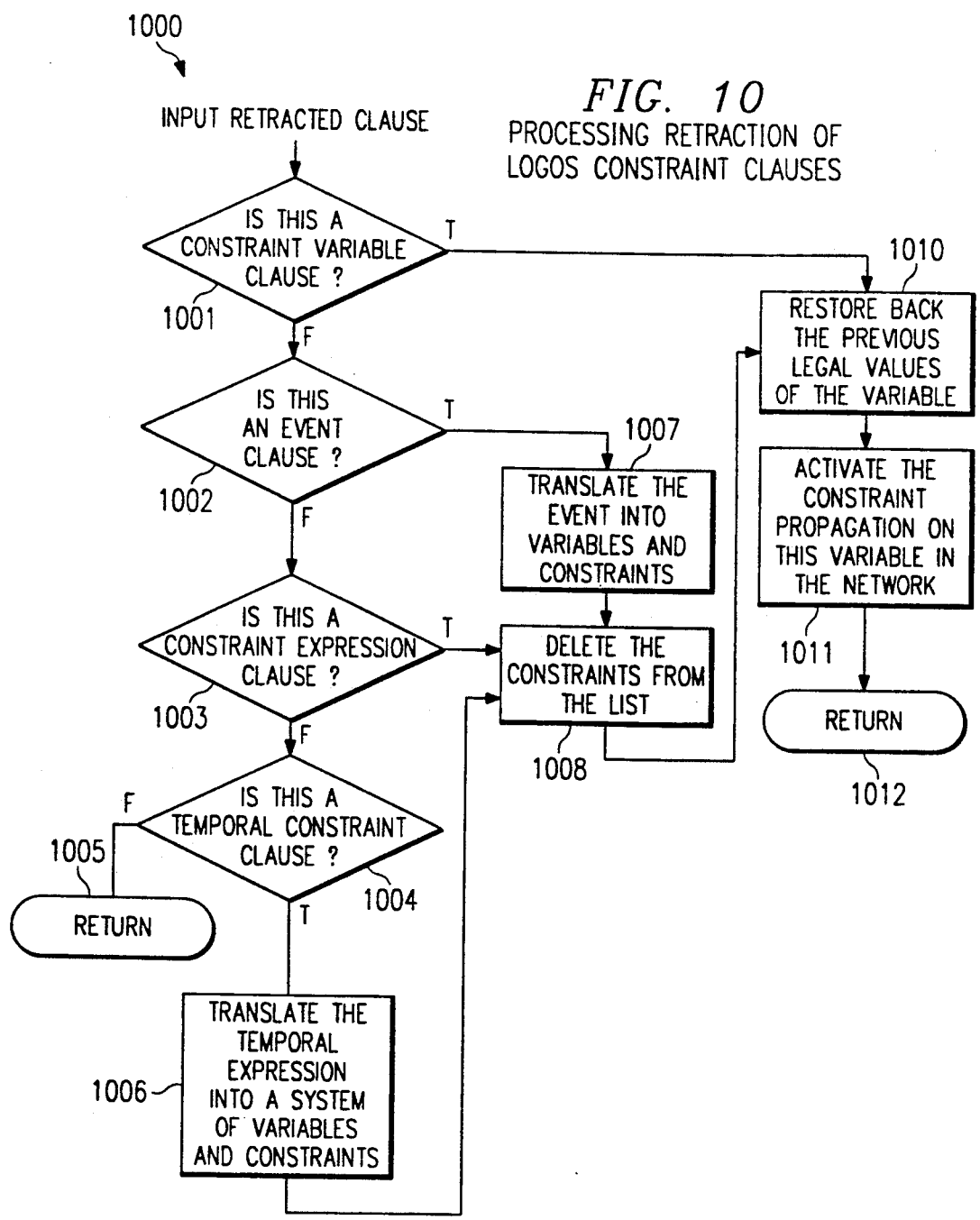

FIG. 10 is a flow diagram for processing retraction of constraint clauses in a preferred embodiment of the present invention. The first step in this algorithm is to input the retracted clause at 1000. If the retraction command processing algorithm determines that the retracted clause is a constraint variable clause at 1001, the next step is to restore back the previous legal values of the variable at 1009. If the query at 1001 is false, then the next query is whether the clause is an event clause at 1002. If so, the constraint clause retraction processing algorithm of FIG. 10 translates the event into variables and constraints at 1007 and deletes the constraints from the list at 1008. If the clause is not an event clause, then the next query is whether this is a constraint expression clause at 1003. If it is a constraint expression clause, then control shifts to delete the constraints from the list at 1008. Otherwise, the next query is whether this is a temporal constraint clause at 1004. If not, control returns to the command processing algorithm of FIG. 3 at 1005. Otherwise, the next step is to translate the temporal expression into a system of variables and constraints at 1006, then to delete the constraints from the list at 1008. Once the constraints are deleted from the list at 1008, the next step is to restore back the previous legal values of the variable at 1009. Regardless of whether the constraint clause retraction processing algorithm of FIG. 10 restores back to the previous legal values of the variables as a result of determining that the clause is a constraint variable clause at 1001 or after deleting the constraints from the list at 1008, the next step is to activate the constraint propagation on the variable in the network at 1001 and then to return to the command processing algorithm of FIG. 3 at 1002. In Common LISP, the following code list performs the necessary steps for the constraint clause retraction processing algorithm of FIG. 10:

trieve the query directly from the database at 1113. Then, the binding retrieves the query by invoking all backward-chaining rules at 1114 within the query retrieval processing algorithm. At this point the bindings backward-chaining rule becomes the union of BINDINGS1 and BINDINGS2 at 1115. Then, the system takes the next binding at 1116 and derives an answer from the binding occurs to replace the variable of the query in B at 1117. Next, the query retrieval processing algorithm appends ANS1 to ANS at 1118 and the algorithm of FIG. 11 queries whether there are more BINDINGS at 1119. If so, control returns to take the next binding from binding at 1116 and repeats steps 1116 through 1118. If not, the next step is to return ANS at 1120 to shift control back to the command processing algorithm of FIG. 3.

The present invention uses code of the following form to perform the query retrieval processing algorithm:

```
process-retrieval ()
    (LET ((query (READ-clause)))
        (COND ((logical-clause-p query)
                (retrieve-logical-clause query))
              (otherwise
                (LET ((binding1 retrieve-from-db query))
                    (binding2
                        (FOREACH (rule :IN (find-backward-chaining-rules query))
                            :SAVE (backward-chain rule clause)))
                    bindings)
                (SETQ bindings (APPEND binding1 binding2))
                (FOREACH (binding :IN bindings)
                    :SAVE (replace-variables query binding))))
        ))
```

© Texas Instruments, Incorporated 1990

```
retract-constraint-clause (clause)
    (COND ((constraint-variable-clause-p clause)
            (update-constraint-variable
                (get-constraint-variable clause)
                (restore-variable-legal-values clause))
            (activate-constraint-network))
          ((constraint-event-clause-p clause)
            (update-constraint-variable
                (get-constraint-variable
                    (translate-event-clause clause))
                (restore-variable-legal-values
                    (translate-event-clause clause)))
            (activate-constraint-network))
          ((constraint-expression-clause-p clause)
            (delete-constraint-expression
                (get-constraint-name clause)
                (get-constraint-expression clause))
            (activate-constraint-network))
          ((temporal-constraint-expression-clause-p clause)
            (delete-constraint-expression
                (get-constraint-name
                    (translate-temporal-constraint clause))
                (get-temporal-constraint-expression
                    (translate-temporal-constraint clause)))
            (activate-constraint-network))
    )
```

© Texas Instruments, Incorporated 1990

FIG. 11 provides a flow diagram of processing of retrieval of queries in a preferred embodiment of the present invention. The command processing algorithm of FIG. 3, by determining that the user has input is a retrieval command, shifts the program control to the query retrieval processing algorithm of FIG. 11. The query retrieval processing algorithm of FIG. 11 begins with input query at 1110 and then determines whether the query is a logical query at 1112. If so, control shifts to the logical query processing algorithm of FIG. 12. Otherwise, the next step is to take the binding and re- The retrieval mechanism of FIG. 11, herein called reason maintenance retrieval (RMS retrieval), first retrieves the goal, then asserts the retrieving process under reason maintenance system 11. In this way, repetitive retrieving is avoided. RMS retrieval provides the basic mechanism for modeling decision-making in a dynamic environment. Once a solution is selected tentatively from other alternatives, the problem solver will use RMS-retrieval to retrieve this particular decision and the system of the present invention will record and assert the proving or retrieving chain (reasons) under RMS.

The assertion of the decision may cause forward deduction, representing the consequences of this decision. It brings the problem solver to a new state and the process of retrieving-then-asserting repeats.

Normal goal-directed retrieval in the system of the present invention provides reasoning such that for a backward-chaining rule (←(Q ?x) (P ?x)) and the assertion (P 1), then (Q 1) is true (or retrievable) but not asserted. The system of the present invention also provides a query form that performs reason maintenance retrieval. The goal is retrieved and asserted as a consequence (with dependency links) of the backward-chaining rule and its antecedents. This makes subsequent retrieval of the same goal efficient, since the deductions needed to reach this conclusion are already in the knowledge base. These assertions may cause further "down-line" effects from forward deductions.

Figure 12:
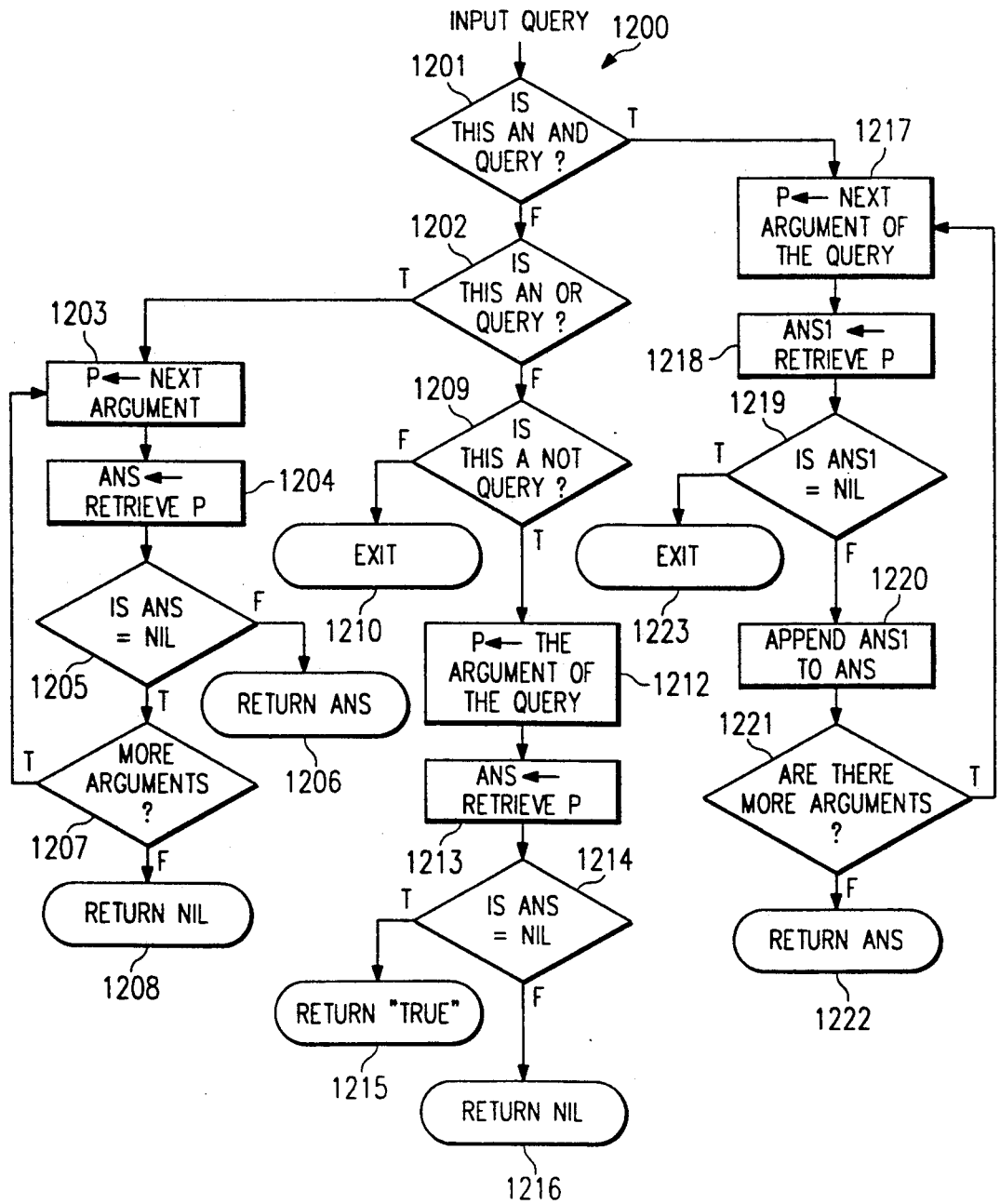

FIG. 12 is a flow diagram of processing logical queries in a preferred embodiment of the present invention. If, at the query retrieval processing algorithm of FIG. 11, it is determined that the query is a logical query, then control shifts to the algorithm for processing logical queries within the system of the present invention at FIG. 12. Beginning with the input query at 1200, the algorithm of FIG. 12 first queries whether this is an "AND" query at 1201. If so, then at 1217, the first step is to assign P to be the next argument of the query. Then, the method takes the answer at 1218 to retrieve the clause, P. The next step is to query whether the answer is equal to NIL at 1219. If so, then control exits the algorithm to return to the command processing algorithm of FIG. 3 at 1223. Otherwise, the logical query processing algorithm of FIG. 12 appends the value ANS1 to the answer at 1220 and then queries whether there are more arguments at 1221. If there are more arguments, then control returns to 1217 to the next clause. Otherwise, the next step is to return an answer at 1222 and return to the command processing algorithm of FIG. 3.

If, at query 1201, it is determined that the query is not an "AND"-query, then the next query, at 1202, is whether this is an "OR" query. If so, the next step is to assign P to be the next argument at 1203 and to derive an answer by retrieving the clause, P, at 1204. Next, to query whether the answer equals NIL at 1205. If so, the next query is whether there are more arguments at 1207. If there are more arguments, then control returns to the step 1203 assign P the next argument at 1203 and the above steps repeat. If at 1205 the answer does not equal NIL, or at 1207 there are no more arguments, then control returns ANS at 1206 and 1208, respectively, for control to be again returned to the command processing algorithm of FIG. 3.

If the query at 1202 determines that the query is not an "OR" query, then the next query, at 1209, is whether the query is a "NOT" query. If not, the logical query's processing algorithm exits at 1210 to the command processing algorithm of FIG. 3. Otherwise, the next step is to assign clause P as the argument of the query at 1212. The next step is to retrieve an answer for clause P at 1213 and then to query whether the answer is equal to the NIL value at 1214. If the answer equals NIL, then return true as the parameter value for P at 1215. Otherwise, return NIL at 1216, at which point control returns to the command processing algorithm of FIG. 3.

The following set of Common LISP commands performs the necessary steps for the logic query processing algorithm of the present invention:

```
retrieve-logical-clause (query)
    (LET (one-answer answers)
        (COND ((AND-query-p query)
                (FORALL (term :IN (REST query))
                    (AND (SETQ one-answer (process-retrieval term))
                        (SETQ answers (APPEND one-answer answers)))))
            ((OR-query-p query)
                (THERE-EXISTS (term :IN (REST query))
                    (SETQ answers (process-retrieval term))))
            ((NOT-query-p query)
                (SETQ answers
                    (NOT (Process-retrieval (SECOND query)))))
        )
    answers)
```

© Texas Instruments, Incorporated 1990

The present invention maintains the dependency of premises and consequences in the deductive reasoning system and of the given constraints and propagated result in the constraint satisfaction system. As a result, when a premise or initial constraint is modified or deleted, the entire system may respond. Because the system treats all statements in the deductive reasoning system and in the constraint satisfaction system as declarative statements, the truth maintenance system of framework 11 responds in a similar manner to a change in premise or initial constraint. Understanding the operation of framework 11 to a change in either of these conditions, is perhaps seen most easily by understanding the operation of a system during a constraint violation procedure.

Figure 13:
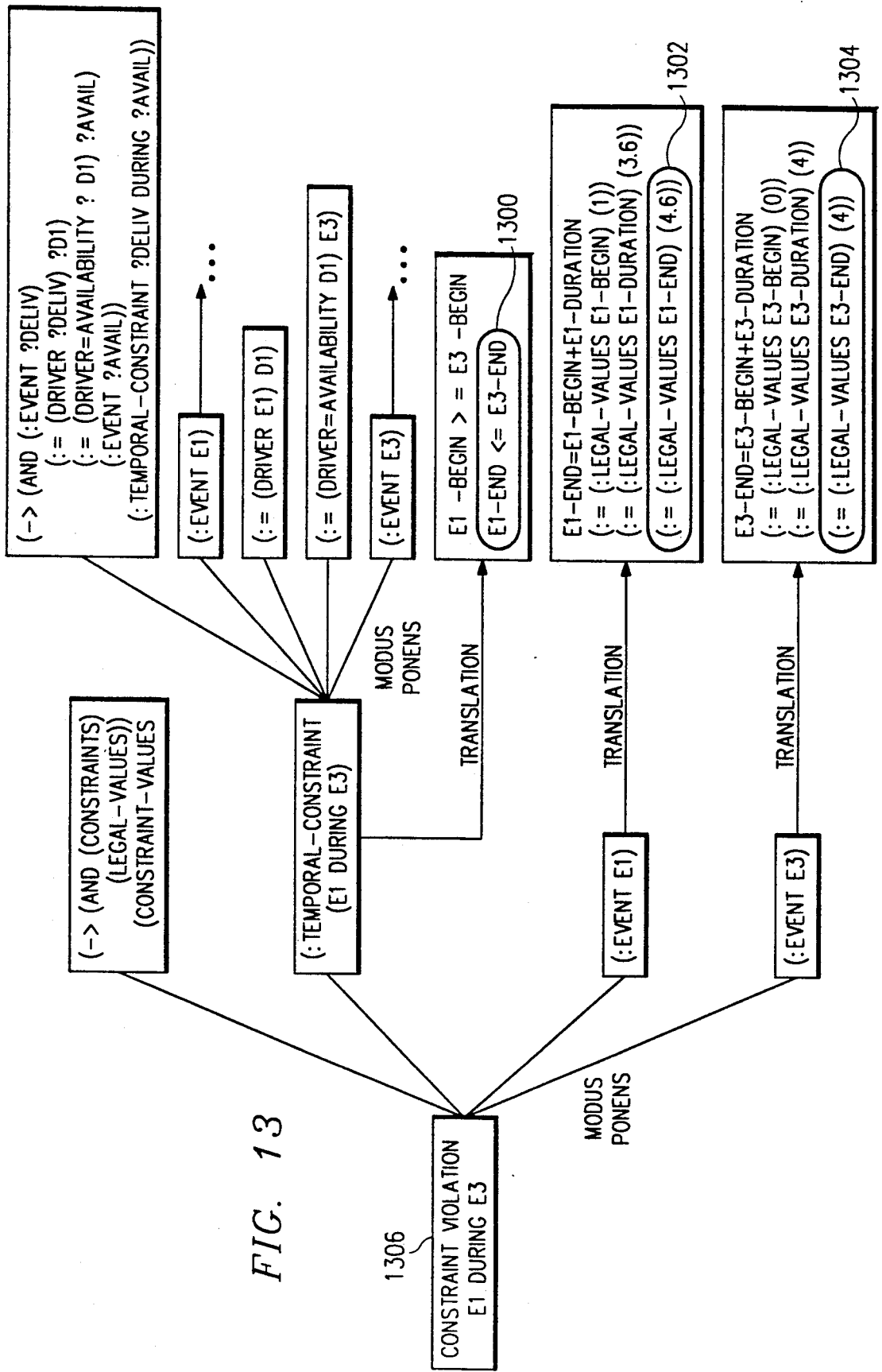
FIG. 13 is an example flow diagram of the constraint violation procedure that a preferred embodiment of the present invention uses.

FIG. 13 shows an example of the constraint violation that a preferred embodiment of the present invention uses. In this example, a constraint violation occurred, denoted by 1306, and was caused by 1300, 1302 and 1304. For daily operation management tasks, simple heuristics such as rearrangement based on priority, delay, cancel, or start early have been the major sources of expertise. For most minor perturbations, such heuristic rules are adequate to patch the problem. However, when the number of affected factors grows, the solutions are not intuitively simple. In the present invention, the system provides the link that can trace back to the constraint clauses which cause the violation.

In the constraint system's terminology, a constraint violation occurs when the set of constraints cannot be satisfied. For complex systems, a perturbation may cause a chain of changes to the system which eventually lead to a constraint violation. When this happens, the action that causes the constraint propagation will be rejected and the system of the present invention asserts the following two Common LISP clauses:

```
(:= (CONSTRAINT-VARIABLE :ERROR) -var-)
(:= (:CONSTRAINT-VIOLATION :ERROR)
    (:CONSTRAINT -expr-))
```

© Texas Instruments, Incorporated 1990

Embedding the constraint satisfaction process in a framework of declarative statements means that the constraint relaxation strategies can also be encoded declaratively. Constraint violation occurs when either a constraint or the legal values of a variable cannot be satisfied. Constraints or legal values then have to be relaxed, modifying the offending constraint or extending the legal values of the offending variable. There is no general method for resolving constraint violations, it is domain dependent.

The state descriptors of the system of the present invention provide a mechanism for maintaining state changes over time. While acceptable for some applications, the stack-based mechanism provided by state descriptors is not sufficient for reasoning about schedule impacts. For a given scheduling problem, a schedule monitoring system might wish to examine a number of solutions. The system must make changes in the knowledge base to implement each solution, but the changes should not be made permanent until the user decides to implement a particular solution. Therefore, for each solution, the changes made to implement that solution need to be isolated so they can be backed out or restored as the user desires. Furthermore, the user may wish to repeat the solution process for a single solution before making a decision as to which solution should be implemented. The solution space resembles a tree rather than a stack. This need is a facility for manipulating "multiple worlds" of information in the system of the present invention.

Figure 14:
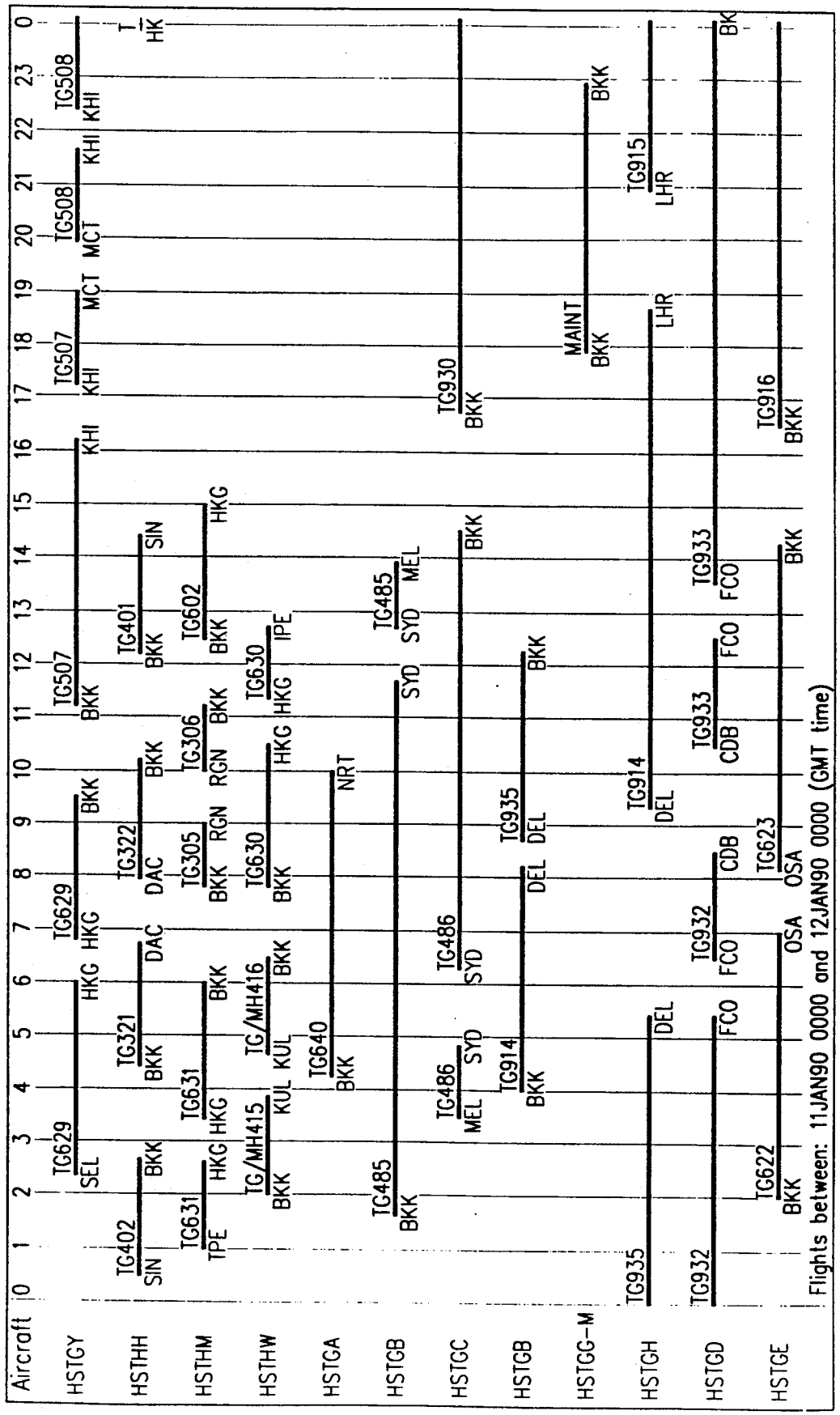

In order to understand the full import of the present invention, an application to an airline flight scheduling problem is illustrated in FIGS. 14 and 15.

FIG. 14 illustrates an application of the present invention for an airline flight operation control problem based on constraint-directed reasoning. This application of the system of the present invention is designed to be an intelligent assistant to aid in controlling flight operations in the airline industry. In this application, a duty manager may input information to the system, such as flight schedule/time table, aircraft assignment, flight crew assignment, airport status information, weather predictions and status, political and industrial information in the destination city and country, and messages of actual flight operation movement.

FIG. 14 shows the typical flight board for one day's schedule. The flight operation controller will input the dynamic situations such as mechanical breakdown, unscheduled maintenance, weather change and airport closing, etc. Along the edge of display FIG. 14, numbers 0, 1, 2, ..., 23, and 0, along the edge represent hours of the day. Designations HSTGY, HSTHH, HSTHM, ... along the FIG. 14 display edge and below the title "Aircraft" identify 12 aircraft within the particular application. Associated with each aircraft are a plurality of bars spanning particular hours. These bars represent flight times of the respective aircraft. Above each bar appears a designation beginning with the letter, "T", to indicate a particular flight designation. Below and at the ends of each bar appear three-letter designations to identify, respectively, the airports of departure and arrival of the flight. For example, the display of FIG. 14 shows that the aircraft, HSTGY, between the hours of approximately 2:15 and 6:00, serves as flight TG629 between the airports SEL (i.e., Seattle, Wash. airport) and HKG (i.e., Hong Kong airport).

The goal of this intelligent decision-aid application of the present invention is to help the duty manager keep track of the flight operations and react to irregularities. Unexpected events such as mechanical failures of aircraft, unscheduled maintenance of aircraft, airport closing due to weather or other political or industrial disruptions, and crew availability need responsive action within a relatively short time, and the decision should be cost-effective.

It is possible to categorize the typical decisions for these operation irregularities in the following way:
1) flight delay
2) flight cancellation
3) cancel portion (or leg) of the flight
4) re-route the flight
5) combine different flights
6) ferry aircraft or crew members
7) change aircraft with a different type
8) change aircraft with the same type Deciding which action to take depends on the constraints on the given situation. That is, the decision has to meet the requirements, and the metaphor of constraint satisfaction suits this type of problem-solving rather naturally. The following sections list the kind of constraints that the system has to reason about.

Any decisions which involve changing or swapping aircraft for a particular flight have to consider the following parameters:
1) availability—the aircraft has to meet the scheduled maintenance requirement
2) type—the aircraft has to accommodate the required passenger and cargo capacity
3) performance—the aircraft has to meet the flight range and maximum take-off and landing weight of airport.

Generally, the decision regarding the aircraft will also directly or indirectly affect other constraints. For example, to decide whether to re-route the aircraft to another airport due to weather conditions requires satisfaction of constraints on flight range and landing weight within the constraints of the airport.

The most important constraint on cabin crew are the working and rest hours requirements. For international flight, visa and other entrance requirements must be considered. However, for the cockpit, the duty manager has to consider some complicated issues regarding qualifications, such as:
1) qualification for the aircraft
2) qualification for the airport
3) qualification for the route of the flight.

The following lists the major constraints regarding landing on an airport. The system will check constraint violations, if any, when the duty manager decides on which airport to land due to some disruption.
1) runway type and status
2) landing permit
3) airport service and closing time
4) curfew
5) ground facility and refueling
6) navigation aid and restriction
7) passenger services and facility
8) weather condition.

In this application of the present invention, each of the above-mentioned constraints are modeled as a constraint variable. The domain of the constraint variable can be a range of values such as the airport curfew and the flight range of the aircraft, or a boolean value such as whether the airport is open or closed. For a decision to change aircraft, after satisfying constraints on aircraft, crew and airport, there are still several possibilities to choose. That is to say, after constraint satisfaction process, a constraint variable may still have a range of values to choose. To pinpoint an exact solution, the cost model is applied to select the optimal value. An operation decision, such as canceling a flight, will certainly incur revenue loss and expense in aircraft maintenance, fuel and crew cost. A decision to delay flight may incur accommodation costs, such as food and lodging of passengers plus the operating cost on the aircraft and crew. A cost-effective decision will try to minimize the total cost of the operation.

One good example of optimal handling of the operation disruption is to swap the aircraft. This action tries to minimize the cost by maximizing the usage of the aircraft and crew. Swapping aircraft means switching the passengers on two similar aircraft such that both aircraft and passengers will achieve their desirable destination.

One significant contribution of a constraint system lies in that the down-line effect of a decision can be properly modeled. The metaphor of constraint propagation can model the situation by trying to satisfy a set of constraints simultaneously. If the duty manager chooses to delay a flight, his decision will impact the connecting flights of passengers, and the availability of the crew and aircraft.

To aid the decision-making process, our system provides a context switching mechanism that can properly model hypothetical scenarios. The manager will post a "what-if" question to the system, and the system will generate the scenario based on the question and display the effect of this decision. In that way, the manager can visualize the change and analyze the effect and cost of this decision before implementing it in the real operation.

Once the system recognizes a problem, it will post the problem in a Problem Board as shown in FIG. 15 to allow the controller to examine the problem further and look for solutions.

Corresponding to the given problem, the problem board displays the possible actions to solve the problem. For example, in FIG. 15 the problem was identified as "aircraft-maintenance-location-affects-flight". That means, the particular aircraft in question has to meet the maintenance requirement within a certain time period. For the flight the aircraft is currently flying, applicable actions are to delay, re-route, substitute or cancel the flight. The recommended solution in this particular case is to substitute the aircraft.

In order to make aircraft substitution possible, the system has to reason about the opportunities to do so, analyze its downline effect and recommend the solution based on the measures for cost-effective solutions. FIG. 16 shows a couple of these intelligent rules to check for constraint violations for the "aircraft-maintenance-location-affects-flight" problem and analyze the possibility of substituting aircraft.

The Logos language statements necessary to support the application of FIGS. 14 and 15 are of the following form:

```
(-> (and (generate-solutions-for-constraint-violation
            aircraft-maintenance-location-affects-flight (?maint-entry ?ac))
         (maintenance-report ?maint ?ac ?apt ?down-from ?down-to)
         (:bind ?affected-flights (:funcall get-maintenance-affected-flights ?maint-entry))
         (:bind ?first-affected-location (:funcall get-flight-airport (:funcall car ?affected-flights) from))
         (:bind ?ac-type (:snrl ?ac :instance))
         (:bind ?candidate-ac (:funcall get-accessible-frames ?ac-type))
         (not (= ?candidate-ac ?ac))
         (:bind ?earliest-down-time (:funcall min (:funcall flight-group-end-time ?affected-flights min)
                                         ?down-from)
         (:bind ?latest-down-time
              (:funcall max (:funcall + ?earliest-down-time (:funcall eval *seconds-in-day*))
                    ?down-to)
         (flight-info-summary-during
            ?candidate-ac ?fit-entry ?first-affected-location ?to-apt ?std ?sta
            ?earliest-down-time ?latest-down-time)
         )
    (possible-substitute-aircraft
         (generate-solutions-for-constraint-violation
            aircraft-maintenance-location-affects-flight (?maint-entry ?ac))
         ?candidate-ac ?std ?affected-flights))
(-> (and (possible-substitute-aircraft
            (generate-solutions-for-constraint-violation
               aircraft-maintenance-location-affects-flight (?maint-entry ?ac))
            ?candidate-ac ?pickup-time ?affected-flights))
         (need-to-go ?ac ?last-flight ?last-flight-to-apt ?maint-apt ?start-time ?end-time)
         (flight-into-summary-during
            ?candidate-ac ?fit-entry ?last-flight-to-apt ?maint-apt ?std ?sta ?start-time ?end-time)
         (:bind ?takeoff-time (:funcall max ?std ?start-time))
         (:bind ?candidate-flights
              (:funcall list (:funcall get-all-next-flights ?fit-entry :include-p t)))
         (:bind ?broken-ac-flights
              (:funcall list (:funcall get-all-next-flights (?last-flight)))
         )
    (generate-alternative-solution
         (aircraft-maintenance-location-affects-flight (?maint-entry ?ac))
         swap-aircraft
         (make-swap-aircraft-scheduling-changes
            ?candidate-ac ?candidate-flights ?ac ?broken-ac-flights ?takeoff-time)))
```

© Texas Instruments Incorporated 1990

Although the invention has been described with reference to the above specific embodiments, this description is not meant to be construed in a limiting sense. Various modifications of the disclosed embodiment, as well as alternative embodiments of the invention will become apparent to persons skilled in the art upon reference to the above description. It is therefore contemplated that the appended claims will cover such modifications that fall within the true scope of the invention.

APPENDIX A

For the preferred embodiment of the present invention the language, written in Common Lisp, has been specifically designed to model the decision-making process in a dynamic environment. The language is called "Logos" and Provides mechanisms to record assumptions and constraints that the decisions have to satisfy. Logos uses the following constructs:

variable   A variable (or a predicate calculus variable) is prefixed with a question mark '?'. For example ?X,

APPENDIX A (continued)

?airport, and ?aircraft are predicate calculus variables in Logos.

constants Numbers and symbols, such as 123, foo, and Bangkok, are constants.

reserved words AND, OR, NOT, →, ←, >, <, >=, <=, =, −, *, +, / define special operations to be performed by Logos. Note: the reserved words take special meanings only when they are the first item of a pattern (a predicate or functor), such as in (AND (P 1) (Q 2)). The AND in the pattern (P AND Q) is treated as a constant.

reserved keywords A reserved keyword is one that has been defined as having a special meaning by Logos. It is also possible for the programmer to define reserved keywords. Reserved keywords are the mechanism by which the programmer alters the normal behavior of Logos. Some of the reserved keywords provided by Logos are :=, :FUNCALL, :MSG, and :BIND. All the reserved keywords provided by Logos will be explained in Section 6. As the reserved words, keywords are interpreted only when they are the first item of a pattern, as in (:MSG Hi there).

fact A fact in Logos is a symbolic pattern (list) of constants, variables, reserved words and keywords.
For example:
(IS MONKEY ANIMAL) - A monkey is an animal
(Pessimist thinks (Life is short) and (Food tastes bad)))
With variables, the interpretation is more subtle:
(Loves Santa ?X) - Santa loves everyone
(NOT (taller ?X ?X)) - No one is taller than himself state descriptor A state descriptor is used to denote the current status of a fact that is expected to change. User-defined state descriptors begin with the ":=" keyword. State descriptors are one of the unique features of Logos. The syntax,
(:= (-status- -entity-) -state-)
is interpreted as "the current status of the entity IS state".

rule There are two classes of rules in Logos:
(− >) -antecedents- -consequents-), and
(< −) -consequent- -antecedents-)
The former are forward-chaining rules, and the latter are backward-chaining rules. For example,
(− > (AND (has-strike ?airport)
    (:= (destination-of ?flight) ?airport))
  (AND (alert ?flight for ?airport strike)
    (protest ?airport authority)))
IF ?airport has a strike, and
  ?flight is en-route to ?airport
THEN alert ?flight for ?airport strike, and
  protest the ?airport authority
(< − (consider-himself ?X lucky)
  (AND (inst ?X human)
    (has-won-a-lottery ?X)
    (:= (life-span-of ?X) ?YR)
    (> ?YR 100)))
?X can consider himself lucky
ONLY IF ?X is a human being, and
  ?X has won a lottery, and
  ?X has lived for ?YR years, and
  ?YR is greater than 100
A valid sentence in Logos is a valid sentence in predicate-calculus plus the above-stated Logos constructs.

What is claimed is:

1. A computer implemented method for building knowledge-based applications respecting a plurality of entities and combining a plurality of decision aid systems in a unified framework, comprising the steps of:
   establishing a truth maintenance system;
   receiving a plurality of declarative relationship statements comprising a statement or relationship among at least two of the entities;
   establishing within said truth maintenance system a deductive reasoning system, said deductive reasoning system comprising a certain subset of said declarative relationship statements;
   establishing within said truth maintenance system a constraint satisfaction system, said constraint satisfaction system comprising a certain subset of said declarative relationship statements;
   recognizing logical dependencies among said declarative relationship statements within said truth maintenance system; and
   maintaining said logical dependencies with respect to said declarative relationship statements.

2. The method of claim 1, further comprising the steps of:
   removing certain of said declarative relationship statements from said truth maintenance system; and
   recognizing the elimination of logical dependencies among certain of said declarative relationship statements remaining within said truth maintenance system as a result of said step of removing.

3. The method of claim 2, further comprising the step of associating a plurality of frame templates within said truth maintenance system, said frame templates comprising a plurality of declarative relationships statements of characteristics of the entities.

4. The method of claim 1, wherein said step of establishing a deductive reasoning system further comprises establishing a forward deductive reasoning system.

5. The method of claim 1, wherein said step of establishing a deductive reasoning system further comprises establishing a backward deductive reasoning system.

6. The method of claim 1, further comprising the steps of associating with said truth maintenance system a language for assisting decision-making in a dynamic environment.

7. The method of claim 6, wherein said decision-making assisting language associating step further comprises the step of associating with said truth maintenance system a device for command processing of said declarative relationship statements.

8. The method of claim 6, wherein said decision-making assisting language associating step further comprises the step of associating with said truth maintenance system a device for assertion processing of said declarative relationship statements.

9. The method of claim 6, wherein said decision-making assisting language associating step further comprises the step of associating with said truth maintenance system, a device for logical clause processing of said declarative relationship statements.

10. The method of claim 6, wherein said decision-making assisting language associating step further comprises the step of associating with said truth maintenance system, a device for "AND"-elimination processing of said declarative relationship statements.

11. The method of claim 6, wherein said decision-making assisting language associating step further comprises the step of associating with said truth maintenance system, a device for modus ponens processing of said declarative relationship statements.

12. The method of claim 6, wherein said decision-making assisting language associating step further comprises the step of associating with said truth maintenance system, a device for constraint clause assertion processing of said declarative relationship statements.

13. The method of claim 6, wherein said decision-making assisting language associating step further comprises the step of associating with said truth maintenance system, a device for command retraction processing of said declarative relationship statements.

14. The method of claim 6, wherein said decision-making assisting language associating step further comprises the step of associating with said truth maintenance system, a device for constraint clause retraction processing of said declarative relationship statements.

15. The method of claim 6, wherein said decision-making assisting language associating step further comprises the step of associating with said truth maintenance system, a device for query retrieval processing of said declarative relationship statements.

16. The method of claim 6, wherein said decision-making assisting language associating step further comprises the step of associating with said truth maintenance system, a device for logical query processing of said declarative relationship statements.

17. A system for building knowledge-based applications respecting a plurality of entities integrating a plurality of decision aid systems, comprising:
- a truth maintenance system, said truth maintenance system comprising means for receiving a plurality of declarative relationship statements and a truth maintenance means for recognizing and maintaining logical dependencies among said declarative relationship statements, said declarative relationship statements comprising a statement of relationship among at least two of the entities;
- a deductive reasoning system associated with said truth maintenance system, said deductive reasoning system comprising a certain subset of said declarative relationship statements; and
- a constraint satisfaction system associated with said truth maintenance system, said constraint satisfaction system comprising a certain subset of said declarative relationship statement.

18. The system of claim 17, further comprising structure within said truth maintenance system for removing certain of said declarative relationship statements from said truth maintenance system and for recognizing the elimination of logical dependencies among certain of said declarative relationship statements remaining within said truth maintenance system.

19. The system of claim 18, further comprising a plurality of frame templates associated within said truth maintenance system, said frame templates comprising a plurality of declarative relationship statements of characteristics of the entities.

20. The system of claim 17, wherein said deductive reasoning system comprises a forward deductive reasoning system.

21. The system of claim 17, wherein said deductive reasoning system comprises a backward deductive reasoning system.

22. The system of claim 17, further comprising a language structure associated with said deductive reasoning system and said constraint satisfaction system for assisting decision-making in a dynamic environment.

23. The system of claim 22, wherein said language structure further comprises a device for command processing of said declarative relationship statements associated with said truth maintenance system.

24. The system of claim 22, wherein said language structure further comprises a device for assertion processing of said declarative relationship statements associated with said truth maintenance system.

25. The system of claim 22, wherein said language structure further comprises a device for logical clause processing of said declarative relationship statements associated with said truth maintenance system.

26. The system of claim 22, wherein said language structure further comprises a device for "AND"-elimination processing of said declarative relationship statements associated with said truth maintenance system.

27. The system of claim 22, wherein said language structure further comprises a device for modus ponens processing of said declarative relationship statements associated with said truth maintenance system.

28. The system of claim 22, wherein said language structure further comprises a device for constraint clause assertion processing of said declarative relationship statements associated with said truth maintenance system.

29. The system of claim 22, wherein said language structure further comprises a device for command retraction processing of said declarative relationship statements associated with said truth maintenance system.

30. The system of claim 22, wherein said language structure further comprises a device for constraint clause retraction processing of said declarative relationship statements associated with said truth maintenance system.

31. The system of claim 22, wherein said language structure further comprises a device for query retrieval processing of said declarative relationship statements associated with said truth maintenance system.

32. The system of claim 22, wherein said language structure further comprises a device for logical query processing of said declarative relationship statements.

33. A computer system for building knowledge-based applications respecting a plurality of entities using a plurality of decision aid systems, comprising:
- a data processor for processing data and commands relating to the entities and storing a plurality of decision aid systems; and
- a system for building knowledge-based applications using a plurality of decision aid systems, comprising:
  - a truth maintenance system, said truth maintenance system comprising means for receiving a plurality of declarative relationship statements and a truth maintenance means for recognizing and maintaining logical dependencies among said declarative relationship statements, said declarative relationship statements comprising a statement of relationship among at least two of the entities;
  - a deductive reasoning system associated with said truth maintenance system, said deductive reasoning system comprising a certain subset of said declarative relationship statements;
  - a constraint satisfaction system associated with said truth maintenance system, said constraint satisfaction system comprising a certain subset of said declarative relationship statements.

34. The computer system of claim 33, further comprising structure within said truth maintenance system for removing certain of said declarative relationship statements from said truth maintenance system and for recognizing the elimination of logical dependencies among certain of said declarative relationship statements remaining within said truth maintenance system.

35. The computer system of claim 34, further comprising a plurality of frame templates associated within said truth maintenance system, said frame templates comprising a plurality of declarative relationships statements of characteristics of the entities.

36. The computer system of claim 34, wherein said deductive reasoning system comprises a forward deductive reasoning system.

37. The computer system of claim 34, wherein said deductive reasoning system comprises a backward deductive reasoning system.

38. The computer system of claim 34, further comprising a language structure associated with said deductive reasoning system and said constraint satisfaction system for assisting decision-making in a dynamic environment.

39. The computer system of claim 38, wherein said language structure further comprises a device for command processing of said declarative relationship statements associated with said truth maintenance system.

40. The computer system of claim 38, wherein said language structure further comprises a device for assertion processing of said declarative relationship statements associated with said truth maintenance system.

41. The computer system of claim 38, wherein said language structure further comprises a device for logical clause processing of said declarative relationship statements associated with said truth maintenance system.

42. The computer system of claim 38, wherein said language structure further comprises a device for "AND"-elimination processing of said declarative relationship statements associated with said truth maintenance system.

43. The computer system of claim 38, wherein said language structure further comprises a device for modus ponens processing of said declarative relationship statements associated with said truth maintenance system.

44. The computer system of claim 38, wherein said language structure further comprises a device for constraint clause assertion processing of said declarative relationship statements associated with said truth maintenance system.

45. The computer system of claim 38, wherein said language structure further comprises a device for command retraction processing of said declarative relationship statements associated with said truth maintenance system.

46. The computer system of claim 38, wherein said language structure further comprises a device for constraint clause retraction processing of said declarative relationship statements associated with said truth maintenance system.

47. The computer system of claim 38, wherein said language structure further comprises a device for query retrieval processing of said declarative relationship statements associated with said truth maintenance system.

48. The computer system of claim 38, wherein said language structure further comprises a device for logical query processing of said declarative relationship statements.

* * * * *